United States Patent [19]

Nakahara

[11] 4,207,600
[45] Jun. 10, 1980

[54] TAPE-DRIVE MODE SELECTING AND ACTUATING MECHANISM FOR TAPE-RECORDER

[75] Inventor: Yasuyuki Nakahara, Yamanashi, Japan

[73] Assignee: Kabushiki Kaisha Sankyo Seiki Seisakusho, Shimosuwa, Japan

[21] Appl. No.: 942,240

[22] Filed: Sep. 14, 1978

[30] Foreign Application Priority Data

Sep. 27, 1977 [JP] Japan .................. 52-116270

[51] Int. Cl.$^2$ .................. G11B 15/18; G11B 19/02
[52] U.S. Cl. .................. 360/71; 360/90
[58] Field of Search .................. 360/71, 90-96, 360/105, 137, 62, 69

[56] References Cited

U.S. PATENT DOCUMENTS

| | | | |
|---|---|---|---|
| 3,619,625 | 11/1971 | Wood | 360/93 |
| 3,890,642 | 6/1975 | Platt | 360/96 |
| 4,000,514 | 12/1976 | Fukatsu | 360/96 X |
| 4,071,865 | 1/1978 | Nakasuna | 360/96 X |
| 4,131,922 | 12/1978 | Yoshida et al. | 360/90 |

Primary Examiner—John H. Wolff
Attorney, Agent, or Firm—Sughrue, Rothwell, Mion, Zinn and Macpeak

[57] ABSTRACT

In a tape recording apparatus, a tape-drive mode selecting and actuating mechanism comprises a plurality of operational terminals corresponding to recording, reproducing, fast-feeding, rewinding and the like, which are aligned in a row adjacent the free end of a pivotable selecting lever. The selecting lever is also slidable and has a pushing portion at its free end for automatically selecting and confronting one of the operational terminals. Once the selecting lever is slidably moved into position, it is pivoted to push the moving means for moving the engaged operational terminals a predetermined length. The tape-drive mode selecting and actuating mechanism further includes light emitting elements and one light-receiving element generating an electrical signal for positioning the pushing portion of the selecting lever at the selected operational terminals corresponding to the tape-drive mode push button selected by the operator.

4 Claims, 4 Drawing Figures

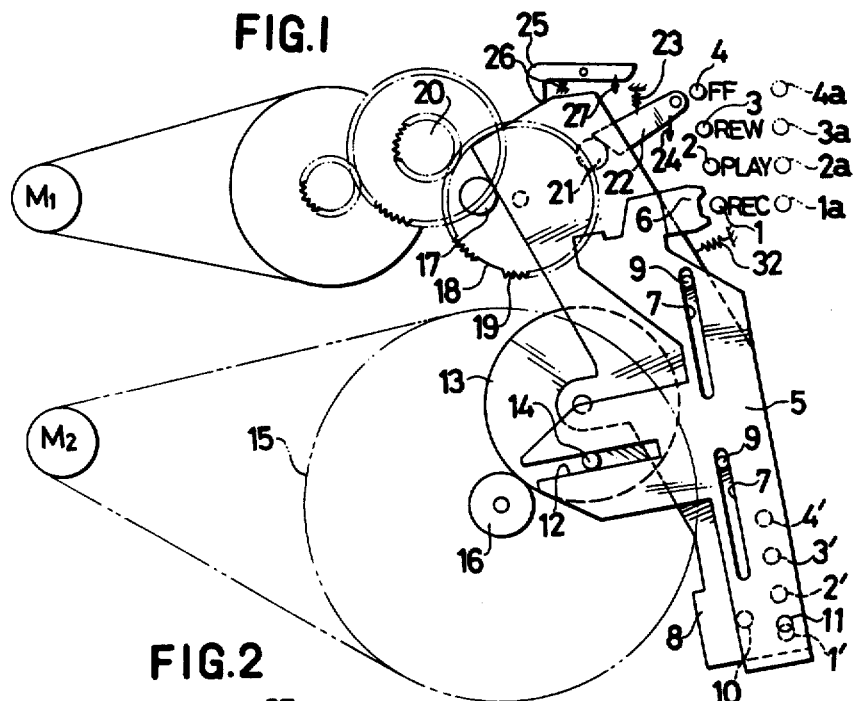
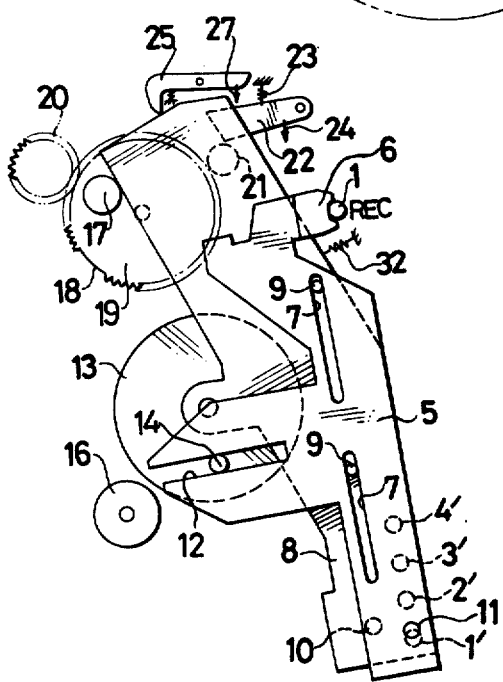

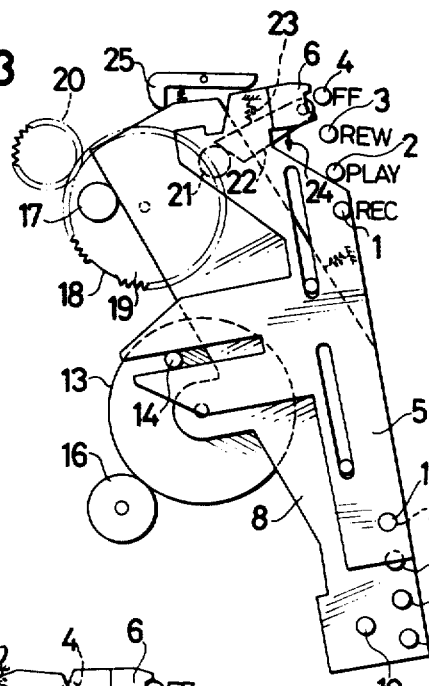
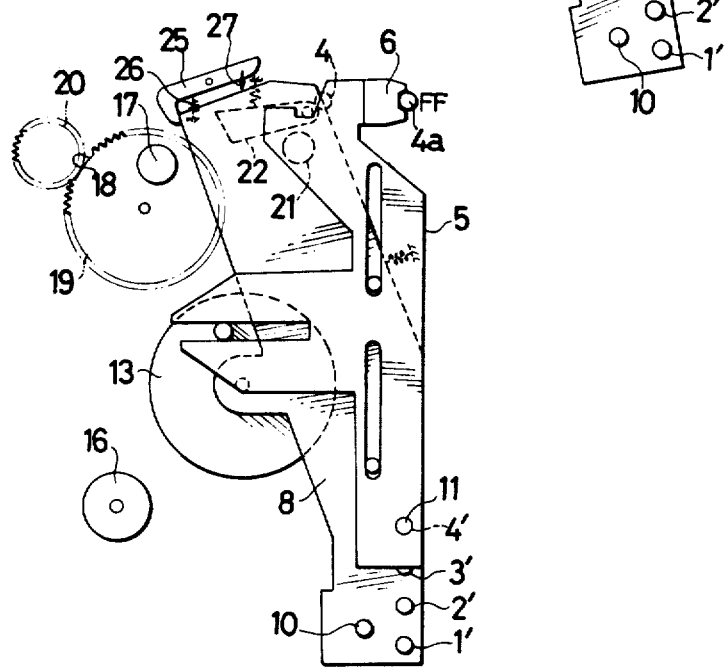

TAPE-DRIVE MODE SELECTING AND ACTUATING MECHANISM FOR TAPE-RECORDER

BACKGROUND OF THE INVENTION

This invention relates to a magnetic tape recording apparatus and more particularly to a tape-drive mode selecting and actuating mechanism for selecting an actuating a tape-drive mode such as recording, reproducing, fast-feeding, rewinding, stopping and the like.

In a conventional mode changeover mechanism, a plate on which magnetic heads and a pinch roller are mounted is moved into and out of contact with a cassette tape directly by the force of depressing push buttons at the time of mode changeover. Furthermore, some prior art devices utilize electrical power for changeover. For example, an electrical signal is generated when the operator's finger slightly touches or depresses a push button and by the electrical signal a solenoid is energized to thereby actuate an associated tape-drive mode mechanism. In this manner, respective solenoids are required for tape-drive modes such as recording, reproducing, fast-feeding and rewinding. Consequently, such a mechanism becomes large in size. Further, a loud mechanical noise is produced by plungers in changeover when the solenoids are energized.

SUMMARY OF THE INVENTION

In view of the above, an object of the invention is to provide a novel tape-drive mode selecting and actuating mechanism which is simplified in construction and miniaturized in size. According to the present invention, the selection and the depression movement of each operational terminal are readily and automatically carried out by only manually depressing or touching the push button to be selected. Further, according to the invention, it is unnecessary to provide a number of solenoids for respective tape-drive mode mechanism and it is possible to utilize for actuating operational terminals a driving force of a motor which is inherent to the tape recording apparatus, and accordingly, the number of necessary mechanical parts is reduced without deterioration of the performance thereof.

BRIEF DESCRIPTION OF THE DRAWINGS

In the accompanied drawings:

FIG. 1 is a plan view of a tape drive mode selecting and actuating mechanism of the invention;

FIG. 2 is a plan view of a primary part of the mechanism shown in FIG. 1, wherein recording operation is finished and the tape recording apparatus is stopped;

FIG. 3 is a plan view of the mechanism shown in FIG. 1, wherein the selecting lever is moved to the fast-feeding operation terminal.

FIG. 4 is a plan view of the mechanism shown in FIG. 1, wherein the locking mechanism is operated for keeping on fast-feeding.

DETAILED DESCRIPTION OF THE INVENTION

The present invention will be hereinafter described in detail, in reference to the accompanying drawings.

In FIG. 1, reference numerals 1, 2, 3 and 4 designate recording, reproducing, rewinding and fast-feeding terminals, respectively. These operational terminals 1, 2, 3 and 4 are aligned in a row. Each of the operational terminals is biased to move from 1a, 2a, 3a and 4a to 1, 2, 3 and 4. A pushing portion 6 of a selecting lever 5 faces or confronts one of the operational terminals 1, 2, 3 and 4. Slide slits 7 in parallel with the line of the operational terminals are formed in the selecting lever 5. Pins 9 which are implanted in a push lever 8 disposed under the selecting lever 5 are slidingly engaged with the slide slits 7. The push lever 8 is rotatably connected to a base plate of the tape recording apparatus at a shaft 10 and is urged to rotate in the clockwise direction by a spring 32. Light emitting elements 1', 2', 3' and 4' each corresponding to one of the above-described operational terminals 1, 2, 3 and 4 are aligned in the push lever 8 in the same direction. One light-receiving element 11 facing one of the light-emitting elements 1', 2', 3' and 4' is mounted on the selecting lever 5.

A long slit or hole 12 is formed in the selecting lever 5, a pin 14 is implanted at an eccentric position on a wheel 13 and the pin 14 is slidably engaged with the long slit 12 in such a manner that the selecting lever is reciprocatingly moved by the rotation of the wheel 3 along with the line defined by the aforementioned pins 9 on the push lever 8. The wheel 13 is in frictional contact with a drive wheel 16 coaxially secured on a fly-wheel 15 which is rotated by a motor $M_2$.

A rotational end portion of the push lever 8 is in abutment with a push pin 17 implanted at an eccentric position on a gear 19 having non-toothed portion 18. The gear wheel 19 is meshed with a pinion 20 which is suitably rotated through a conventional gear mechanism by another motor $M_1$. A control lever 22 rotatably secured to the base plate is selectively abutted with a pin 21 implanted in a rotational end portion of the push lever 8. The control lever is connected to a spring 23 and a solenoid 24. A locking lever 25 an intermediate portion of which is rotatably secured to the base plate is urged to engage with the push lever 8 by a spring 26 and the locking lever 25 is disengaged therefrom by energizing another solenoid 27.

In operation, for example, FIG. 2 shows a state wherein recording operation (REC) is finished and thereafter, the tape recording apparatus according to the present invention is stopped, and more specifically, the non-toothed portion 18 is passed through pinion 20, the gear 19 is engaged with the pinion 20, and the motor $M_1$ is stopped. At the same time, a pushing portion 6 is in abutment with the operational terminal (REC) 1 and the wheel 13 is remote from the drive wheel 16 because the push lever 8 is urged to rotate in the clockwise direction by the spring 32. In such a state, when the fast-feeding operation is required, the operator's finger slightly touches or depresses the fast-feeding button. Then, the motor $M_2$ is rotated with the wheel 16 driven. Further, the solenoid 24 is energized to thereby rotate the control lever 22 in the counterclockwise direction while the pin 21 is pushed to the left by the end cam surface of the control lever and then the push lever 8 is counterclockwise rotated around the shaft 10, as a result of which the wheel 13 is in contact with the drive wheel 16. Accordingly, the rotational force is transmitted to the wheel 13 and the pin 14 is also rotated. With this movement of the pin 14, the selecting lever 5 is slidably moved on the push lever 8.

On the other hand, since when the fast-feeding button is slightly touched or depressed by the operator's finger the light-emitting element 4' corresponding thereto illuminates, at the time when the light-receiving element 11 coincides with the light-emitting element 4' by the movement of the selecting lever 5 an output power of the light-receiving element 11 is generated therein (refer to FIG. 3). By this output signal the solenoid 24 is deenergized, the lever 22 is clockwise rotated by the spring 23 to be disengaged from the pin 21. Consequently, the push lever 8 is clockwise rotated by the spring 32 to thereby release the frictional engagement between the wheels 13 and 16. By these successive operations, the movement of the selecting lever 5 is stopped. Further, the motor $M_1$ is driven by the output signal of the light-receiving element 11. Accordingly, the pin 17 of the gear is rotated so that the lever 8 is clockwise rotated with respect to the shaft 10. As a result, the operational terminal 4 is moved to the position 4a as shown in FIG. 4. When the rotational movement of the lever 8 is performed by a predetermined length, the push lever 8 is locked by the locking lever 25 as shown in FIG. 4 and the fast-feeding operation is continued. The gear 19 is rotated a little after the locking is performed. However, when the non-toothed portion 18 confronts the pinion 20, the gear 19 is stopped.

Next, when the stop of the above-described fast-feeding operation is required, the stop button (not shown) is slightly depressed, the rotations of the motors $M_1$ and $M_2$ are stopped, the solenoid 27 is energized during a short period of time, and then the lock lever 25 is rotated in the clockwise direction to thereby release the engagement between the locking lever 25 and the push lever 8.

At this time, the push lever 8 is counterclockwise rotated around the shaft 10 by the spring force of the spring (not shown) which is connected to the operational terminal 4. Also, the gear 19 is counterclockwise rotated because the pin 17 is pushed by the lever 8. Namely, only the selecting lever 5 is positioned at the fast-feeding terminal 4 and the other mechanical parts are returned to substantially the same positions as shown in FIG. 2.

In the above description, only the changeover operation of the operation modes from recording to fast-feeding is illustrated in detail. However, apparently, other changeover operations can be performed in the same manner.

Though in the above-described embodiment, the push lever 8 is pushed by the pin 17 of the gear 19, the push lever 8 may be drawn by a solenoid in order to obtain the same effect.

Two motors $M_1$ and $M_2$ are used in the above embodiment. However, a single motor may be used instead of the two motors if suitable changeover means is provided therein.

For easily understanding the invention the two solenoids 24 and 27 for the levers 22 and 25 are used in the above embodiment. However, desirably, a single solenoid should be operatively used therein.

Further, the lever 22 which is used for the engagement/disengagement between the wheels 13 and 16 may be omitted if the push lever 8 is pushed by the pin 17 without a time lag after the output of the light-receiving element is generated.

Furthermore, though in the above embodiment any of the operations must be carried out through the stopping operation by the stop button, the changeover between the operational modes can be carried out without the stop button if each of the operational terminals has releasing means for releasing the lock lever 25.

What is claimed is:

1. A tape-drive mode selecting and actuating mechanism for a tape-recording apparatus comprising:
   a frame body;
   a plurality of operational buttons having associated means for generating electrical signals for changeover of the tape-drive modes, each of said operational buttons being manually selectable by the operator;
   a plurality of operational terminals each movable a predetermined length for changeover of the tape-drive modes, said operational terminals each actuating a corresponding tape-drive mode mechanism when moved said predetermined length, said operational terminals aligned in a row;
   a spring-biased push lever rotatably connected to said frame body;
   a selecting lever selecting one of said operational terminals corresponding to the tape-drive mode selected by the operator, said selecting lever reciprocatingly movable on the push lever in the same direction as that of the row of the operational terminals, said selecting lever having a pushing portion for engaging and pushing one of said operational terminals the predetermined length required for changeover of the tape-drive mode;
   moving means for reciprocatingly moving said selecting lever in response to an electrical signal generated when one of the operational buttons is pushed so that said pushing portion is adjacent an operational terminal corresponding to the pushed button;
   driving means for moving said selecting lever so that the pushing portion of the selecting lever moves said corresponding one of the operational terminals said predetermined length;
   light emitting elements 1′, 2′, 3′ and 4′ aligned on said push lever in the same order as the operational terminals 1, 2, 3 and 4 and in the same direction as the direction in which the selecting lever is reciprocatingly moved by said moving means, one of said light-emitting elements generating an illumination signal when a corresponding one of the operational buttons is depressed; and
   a light-receiving element on the selecting lever selectively confronting one of the light-emitting elements and, when the light-receiving element receives said illumination signal generated in said one of the light-emitting elements, generating an electrical signal by which said moving means is stopped from operating and the selecting lever is stopped from moving.

2. A tape-drive mode selecting and actuating mechanism according to claim 1, wherein said moving means comprises a drive wheel 16 driven by a motor $M_2$, a driven wheel 13 engagable with the drive wheel and said selecting lever for reciprocating said selecting lever in response to the transmitting rotational force of the drive wheel, said apparatus further comprising:
   control means controlling said moving means, and including a spring-biased control lever 22 and a solenoid, for pressing the driven wheel 13 to the drive wheel when the solenoid is energized and for separating the driven and drive wheels when the solenoid is deenergized.

3. A tape-drive mode selecting and actuating mechanism according to claim 1, wherein said driving means includes a gear wheel 18 having a non-toothed portion, a pin 17 implanted in the gear wheel, and rotating means for rotating said gear wheel so as to move the push lever in abutment with the pin implanted in the gear wheel, said non-toothed portion serving to interrupt the transmission of rotational force from the rotating means to the gear wheel.

4. A tape-drive mode selecting and actuating mechanism according to claim 1, further comprising:
a locking mechanism, including a locking lever spring-biased toward the push lever, for engaging the push lever so as to continue the selected tape-drive mode operation.

* * * * *